United States Patent
Sheth et al.

(10) Patent No.: US 9,065,814 B2
(45) Date of Patent: Jun. 23, 2015

(54) TRANSLATION BETWEEN TELEPHONE DEVICE AND NETWORK CLIENT

(75) Inventors: Sachin Sheth, Bothell, WA (US); Vinit Deshpande, Woodinville, WA (US); Timothy J. Rang, Berwyn, PA (US); Alexandre M. Gimenez, Woodinville, WA (US); Yu An, Sammamish, WA (US); Ajit Kalele, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 13/361,960

(22) Filed: Jan. 31, 2012

(65) Prior Publication Data

US 2013/0195118 A1 Aug. 1, 2013

(51) Int. Cl.
*H04L 29/06* (2006.01)
*H04W 4/16* (2009.01)

(52) U.S. Cl.
CPC .............. *H04L 69/08* (2013.01); *H04L 69/18* (2013.01); *H04W 4/16* (2013.01)

(58) Field of Classification Search
USPC ........................... 370/351, 352, 466; 709/222
See application file for complete search history.

(56) References Cited

U.S. PATENT DOCUMENTS

| | | | |
|---|---|---|---|
| 6,356,905 B1 | 3/2002 | Gershman et al. | |
| 8,090,401 B2* | 1/2012 | Soto | 455/553.1 |
| 2002/0101965 A1* | 8/2002 | Elzur | 379/93.01 |
| 2005/0015516 A1 | 1/2005 | Ju | |
| 2006/0058003 A1* | 3/2006 | Lee | 455/403 |
| 2008/0069069 A1 | 3/2008 | Schessel et al. | |
| 2008/0247531 A1* | 10/2008 | Borislow et al. | 379/218.01 |
| 2009/0318081 A1* | 12/2009 | Winter | 455/41.2 |
| 2011/0280142 A1* | 11/2011 | Bychkov | 370/252 |
| 2013/0013755 A1* | 1/2013 | Huang | 709/222 |
| 2013/0155170 A1* | 6/2013 | Eichen et al. | 348/14.02 |

OTHER PUBLICATIONS

"Connecting Android Phone through Adhoc Wifi Network", Retrieved at <<http://blog.joint.net/2009/07/connecting-android-phone-through-adhoc.html>>, Retrieved Date: Oct. 10, 2011, pp. 1-8.

(Continued)

*Primary Examiner* — Benjamin H Elliott, IV
*Assistant Examiner* — Yaotang Wang
(74) *Attorney, Agent, or Firm* — Andrew Smith; Jim Ross; Micky Minhas (57) ABSTRACT

Call control messages and audio signals between a telephone device and a computer network telephone client on a computing device can be intercepted. For control messages from the computer network telephone client, the control messages can be translated from a first control protocol to a second control protocol and forwarded to the telephone device. For control messages from the telephone device, the control messages can be translated from the second control protocol to the first control protocol and forwarded to the computer network telephone client. For audio signals from the computer network telephone client, the audio signals can be translated from a first audio protocol to a second audio protocol and forwarded to the telephone device. For audio signals from the telephone device, the audio signals can be translated from the second audio protocol to the first audio protocol and forwarded to the computer network telephone client.

20 Claims, 6 Drawing Sheets

(56) References Cited

OTHER PUBLICATIONS

Kingsley, Robert, "Is There a Way to Connect My Blackberry Through My Laptop Internet Connection Using WiFi?", Retrieved at <<http://techtips.salon.com/there-way-connect-blackberry-through-laptop-internet-connection-using-wifi-3977.html>>, Retrieved Date: Oct. 10, 2011, pp. 3.

Unuth, Nadeem, "Three Ways of Making a VoIP Connection", Retrieved at <<http://voip.about.com/od/voipbasics/a/threewaysofuse.htm>>, Retrieved Date: Oct. 10, 2011, p. 1.

"Analog Telephone Adapter (ATA)", Retrieved at <<http://searchunifiedcommunications.techtarget.com/definition/analog-telephone-adapter>>, Retrieved Date: Oct. 10, 2011, pp. 13.

"Microsoft® Lync™ Server 2010 Product Guide", Retrieved at <<http://download.microsoft.com/download/0/A/6/0A6C616B-B3B7-4147-A040-9D90B6810B4F/LyncServer2010ProductGuide_EN-US.pdf>>, Copyright Notice Date: 2010, pp. 42.

"Better Together: New Endpoings for Microsoft Lync Increase Functionality and Appeal", Retrieved at <<http://www.telecomreseller.com/2011/06/10/better-together-new-endpoints-for-microsoft-lync-increase-functionality-and-appeal/>>, Jun. 10, 2011, pp. 2.

* cited by examiner

TRANSLATION BETWEEN TELEPHONE DEVICE AND NETWORK CLIENT

BACKGROUND

In systems that use communications servers to allow telephone devices and network telephone clients to make telephone calls through the communications servers, it can be beneficial to pass control and audio signals between a telephone network client and a telephone device. For example, this can allow user input commands from the network telephone client to control a call being made using a telephone device (e.g., putting the call on hold, etc.) and vice versa. Also, the passing of audio information may allow a call being made on a network telephone client to be continued on a telephone device and vice versa. This has been done using the universal serial bus (USB) protocol, where control messages have been passed in human interface device (HID) reports and audio information has been passed as USB audio information.

SUMMARY

The tools and techniques described herein relate to translation between telephone devices and network clients using different protocols. For example, this can include translating control messages between one protocol used by a telephone network client and a second protocol used by a telephone device. Audio information may also be translated between protocols and passed between the telephone network client and the telephone device. This can allow for association and/or synchronization of telephone call control messages and/or audio signals between the telephone network client and the telephone device during telephone calls, even if the client and device are not using the same protocols as each other for exchanging audio signals and control messages.

In one example, the tools and techniques can include intercepting call control messages and audio signals between a telephone device and a computer network telephone client on a computing device. For control messages that are from the computer network telephone client, the control messages can be translated from a first control protocol to a second control protocol and forwarded to the telephone device. For control messages that are from the telephone device, the control messages can be translated from the second control protocol to the first control protocol and forwarded to the computer network telephone client. Similarly, for audio signals that are from the computer network telephone client, the audio signals can be translated from a first audio protocol to a second audio protocol and forwarded to the telephone device. For audio signals that are from the telephone device, the audio signals can be translated from the second audio protocol to the first audio protocol and forwarded to the computer network telephone client.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved passing of information between a telephone network client and a telephone device. Such improvements may result from the use of various techniques and tools separately or in combination.

Such techniques and tools may include utilizing a translating component to intercept and translate information traffic between a telephone network client and a telephone device (e.g., an Internet protocol phone). For example, the translating component may be a driver such as a user mode driver framework (UMDF) driver on a client computing device (e.g., a desktop computer, laptop computer, slate device, etc.). In one implementation, the telephone network client may be configured to send and receive control messages and audio signals using the USB protocol (which may be considered to include a protocol for control messages as HID reports and another protocol for audio messages as USB audio). The translating component can intercept the USB traffic from the telephone network client. The translating component can send the intercepted traffic over the transport of choice (using a second protocol) to the telephone device. Similarly traffic sent by the telephone device using the transport of choice can be received by the translating component. The translating component can send that traffic as USB traffic to the telephone network client. The translating component can allow for additional plugins to be added to the translating component to support additional transport protocols for telephone devices that use such protocols.

Accordingly, one or more benefits may be provided. For example, the translating component may provide extensibility hooks that can allow association and synchronization with telephone devices using different protocols. This may be done without the telephone network client needing to be revised to support the additional protocols.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
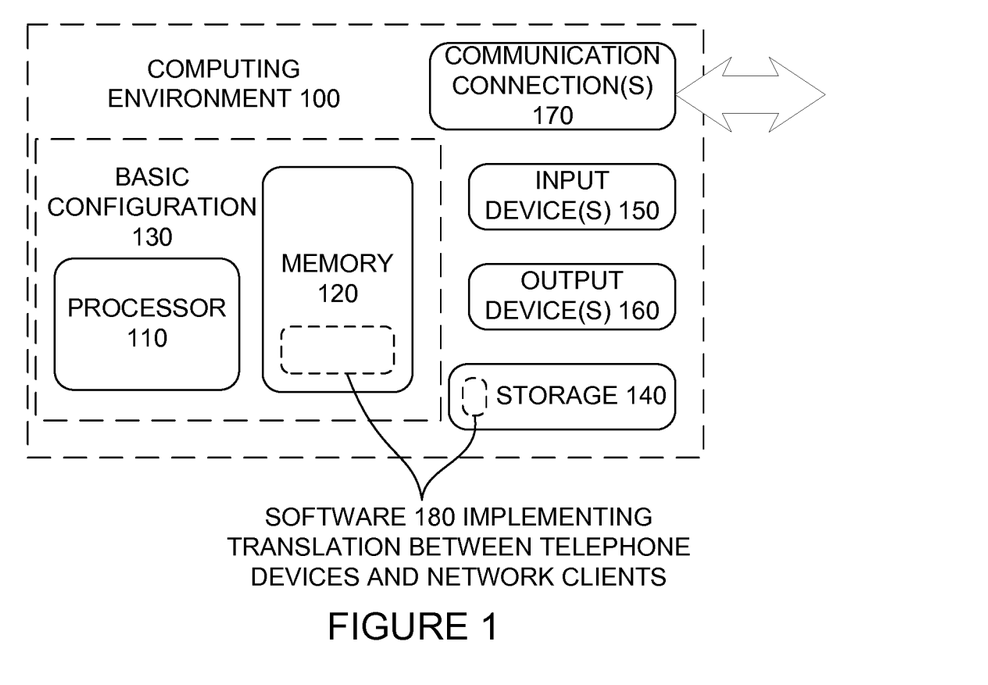
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a telephone device, a communications server, and/or a computing device hosting a telephone network client. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, slate devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing one or more aspects of translation between telephone devices and network clients using different protocols.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Telephone Device and Network Client Translation System and Environment

Figure 2:
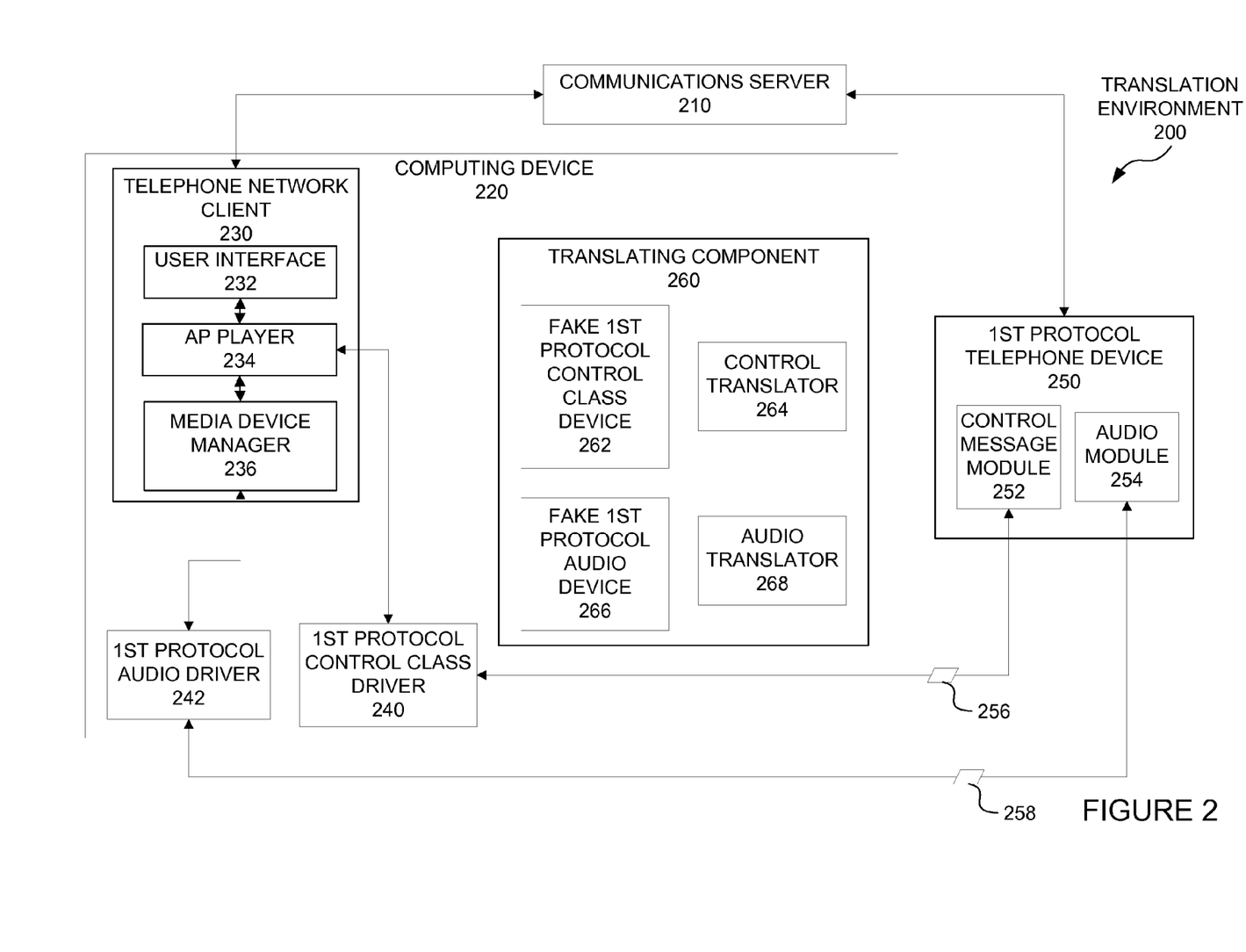
FIG. 2 is a block diagram of a telephone device and network client translation environment.

FIG. 2 is a block diagram of a telephone device and network client translation environment (200) in conjunction with which one or more of the described embodiments may be implemented. The environment (200) can include a communications server (210), such as a server for making telephone calls (e.g., audio-only calls, video calls, audio calls with interactive screen features, etc.). A computing device (220) can host a telephone network client (230), which can interact with the communications server (210) to make telephone calls through the communications server. For example, the computing device (220) may be remote from the communications server (210), and may be connected to the communications server (210) through a computer network, such as a global computer network. The telephone network client (230) can include components such as a user interface component (232) for executing user interface features (e.g., receiving user input and presenting output to a user); an application player (234) for executing application features for making and managing communications such as telephone calls, and a media device manager (236) for managing devices that can be used with the telephone network client (230).

A. Call Association and Synchronization Using a First Protocol

Calls made by the telephone network client (230) can be made through the communications server (210) using one or more protocols, such as a protocol for voice over Internet Protocol. The computing device (220) can also include a first protocol control class driver (240) and a first protocol audio driver (242), which can facilitate communication of control messages and audio signals between the telephone network client (230) and a first protocol telephone device (250) (i.e., a telephone device that is capable of interacting using the first protocol.). As an example, the first control protocol may be a universal serial bus (USB) protocol, an Ethernet protocol, or some other protocol.

In one implementation, the first protocol telephone device (250) can include a control message module (252), which can interact with the first protocol control class driver (240) to send/receive control messages (256) between the first protocol telephone device (250) and the telephone network client (230). Specifically, the first protocol class driver (240) can act as an intermediary to pass control messages (256) between the application player (234) of the telephone network client (230) and the control message module (252) of the first protocol telephone device (250).

The first protocol telephone device (250) can also include an audio module (254) that can send and receive audio signals. The first protocol audio driver (242) can act as an intermediary to pass audio signals (258) between the audio module (254) of the first protocol telephone device (250) and the media device manager (236) of the telephone network client (230) using a first audio protocol.

As is indicated by the line between the first protocol telephone device (250) and the communications server (210) in FIG. 2, the first protocol telephone device (250) can communicate with the communications server (210). Accordingly, the first protocol telephone device (250) can make telephone calls through the communications server (210) independent of the computing device (220). Likewise, the telephone network client (230) on the computing device (220) can make telephone calls through the communications server (210) independent of the computing device (220). However, as discussed above, the first protocol telephone device (250) and the telephone network client (230) can exchange control messages (256) and audio signals (258) to associate the first protocol telephone device (250) with the telephone network client (230), and to allow calls on each to be controlled by the other.

For example, a call can be made using the telephone network client (230), and the first protocol telephone device (250) may be used by a user talking on the telephone device (250). The user in such a situation may be able to use the computing device (220) and/or the first protocol telephone device (250) to issue control messages (256) to control the call. For example, a user could use the first protocol telephone device (250) to put the call on hold, and this could be synchronized with the telephone network client using a control message (256). As another example, a user could use the computing device (220) to transfer the call, and this could be synchronized with the first protocol telephone device (250) using a control message (256). Likewise, audio signals (258) can be transmitted between the computing device (220) and the first protocol telephone device (250) so that a user may use either device for the microphone and/or speaker for a telephone call, regardless of which device initially made the call.

B. Translation Between Telephone Device and Network Client

Referring still to FIG. 2, the computing device (220) may also include a translating component (260). The translating component (260) can include a fake first protocol control class device (262), a control translator (264), a fake first protocol audio device (266), and an audio translator (268). The translating component (260) may be a software and/or hardware component. As can be seen in FIG. 2, the translating component (260) is not being used because the first protocol telephone device (250) is capable of communicating audio and control information to/from the computing device (220) using the first protocol.

Figure 3:
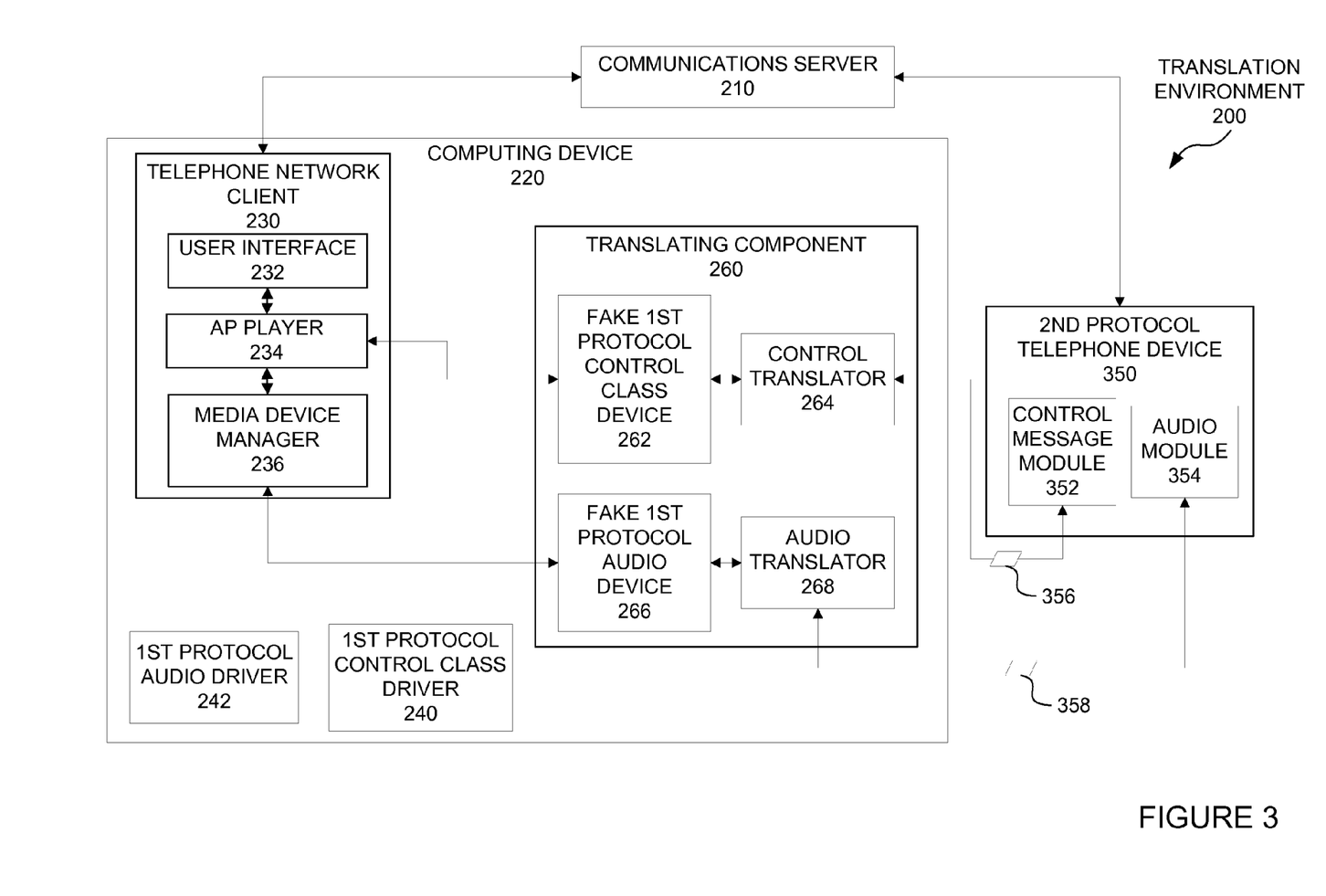
FIG. 3 is a block diagram of the environment of FIG. 2 illustrating use with a telephone device using a different protocol from the telephone network client.

Referring now to FIG. 3, a second protocol telephone device (350) is used in the translation environment (200) instead of the first protocol telephone device (250). The second protocol telephone device (350) includes a control message module (352) and an audio module (354) that are configured to communicate using a second protocol that is different from the first protocol used by the telephone network client (230). In this configuration, the translating component (260) can act as an intermediary between the telephone network client (230) and the first protocol telephone device (250) to exchange control and audio information.

Accordingly, if telephone call control information is entered in the client computing device (220) while the telephone network client (230) is associated with the second protocol telephone device (350), the application player (234) can send a control message (356) to the fake first protocol control class device (262), with the control message (356)

being formatted according to the first protocol. The fake first protocol control class device (262) can interact with the application player (234) in the same manner as the first protocol control class driver (240), so that it appears to the application player (234) that the application player (234) is interacting with a telephone device using the first protocol. However, the fake first protocol control class device (262) can forward control messages (356) from the application player (234) to the control translator (264). The control translator (264) can translate control messages between the first protocol and the second protocol. For example, the control translator (264) may use a data structure that maps control messages in the first protocol to control messages in the second protocol to perform the translation of control messages. The translated control messages (356) from the application player (234) can be forwarded to the control message module (352) formatted according to the second protocol.

Similarly, if control information is entered in the second protocol telephone device (350), the control message module (352) can send one or more control messages (356) formatted according to the second protocol to the computing device (220), where the messages (356) can be received at the control translator (264). The control translator (264) can translate the control messages (356) from the second protocol to the first protocol, and forward the control messages (356) to the fake first protocol control class device (262). The fake first protocol control class device (262) can forward the translated control messages (356) to the application player (234), as if the control messages (356) had been sent from a device that uses the first protocol.

Audio signals (358) can be translated and exchanged similarly to the control messages (356). For example, if audio information is received at the computing device (220) for a telephone call for which the telephone network client (230) and the second protocol telephone device (350) are associated, the media device manager (236) can send an audio signal (358) to the fake first protocol audio device (266). The fake first protocol audio device (266) can interact with the media device manager (236) as if the media device manager (236) were interacting with an audio device that uses the first protocol. However, the fake first protocol audio device (266) can forward the audio signal (358) to the audio translator (268). The audio translator (268) can translate the audio signal (358) from the first protocol to the second protocol. For example, such translation may be done using mappings and/or other translating algorithms. For example, such translation may involve decoding an audio signal (358) formatted according to the first protocol, and re-encoding the audio signal according to the second protocol.

Similar types of translation may be performed for translating the audio signals (358) from the second protocol to the first protocol. For audio signals (358) received from the telephone network client (230), the audio translator (268) can forward the translated audio signals (358) to the second protocol telephone device (350), with the audio signals (358) being formatted according to the second protocol.

If audio information is received at the second protocol telephone device (350) on a telephone call for which the second protocol telephone device (350) is associated with the telephone network client (230), the audio module (354) can send audio signals (358) to the computing device (220). The audio signals (358) can be received at the audio translator (268), where the audio signals (358) can be translated from the second protocol to the first protocol and forwarded to the fake first protocol audio device (266). The fake first protocol audio device (266) can forward the translated audio signals (358) from the second protocol telephone device (350) to the telephone network client (230), where the audio signals can be received by the media device manager (236).

Control messages (356) and audio signals (358) can be sent between the different components of the translation environment (200) in various ways. For example, control messages (356) and audio signals (358) may be transmitted between components in the computing device (220) using application programming interface calls, function calls, etc. Control messages (356) and audio signals (358) may be transmitted between the computing device (220) and the second protocol telephone device (350) using wired (e.g., USB, Ethernet, etc.) or wireless (e.g., Bluetooth, etc.) protocols or techniques. Also, communications between the computing device (220), the second protocol telephone device (350), and the communications server (210) may include communicating over one or more computer networks. For example, the computing device (220) and the second protocol telephone device (350) may communicate with the communications server (210) over a global computer network. The communications server (210) may then communicate with other communications devices, such as telephone devices, using one or more communications networks, such as telephone networks, global computer networks, etc. Additionally, the translating component (260) may be located outside the computing device (220), and may communicate with the computing device (220) over one or more wired and/or wireless connections.

Additional fake devices and translators may be added to the computing device (220) to support additional protocols. Accordingly, the computing device (220) could be extended to support association and exchange of control and audio information with telephone devices using a third protocol, a fourth protocol, etc. This may be done without modifying the telephone network client (230).

III. Telephone Device and Network Client Translation Techniques

Several techniques for translation between telephone devices and network clients will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique.

Figure 4:
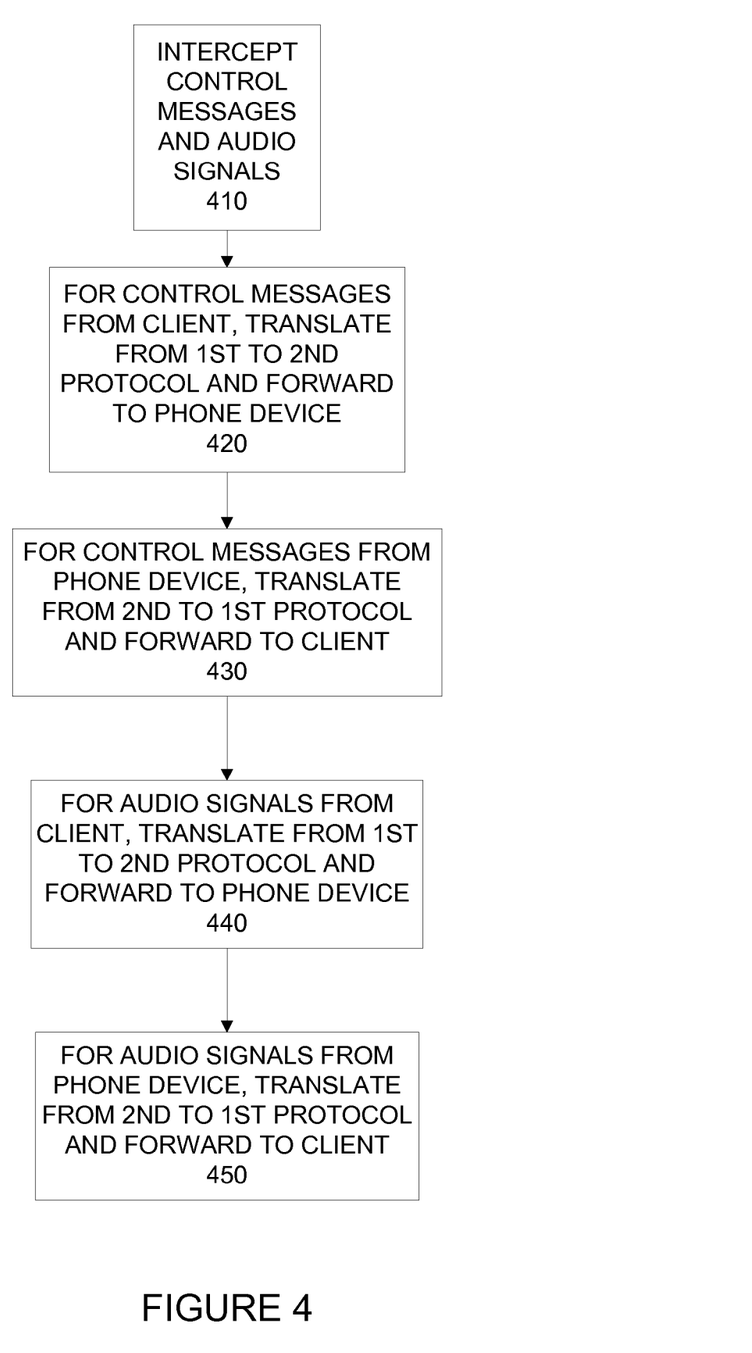
FIG. 4 is a flowchart of a technique for translation between telephone devices and network clients.

Referring to FIG. 4, a technique for translation between telephone devices and network clients will be described. The technique can include intercepting (410) call control messages and audio signals between a telephone device and a computer network telephone client on a computing device. The telephone call control messages and the audio signals can be for a telephone call. For one or more of the control messages that are from the computer network telephone client, the technique can include translating from a first control protocol to a second control protocol and forwarding to the telephone device (420). For one or more of the control messages that are from the telephone device, the technique can include translating from the second control protocol to the first control protocol and forwarding to the computer network telephone client (430). For one or more of the audio signals that are from the computer network telephone client, the technique can include translating from a first audio protocol to a second audio protocol and forwarding to the telephone device (440). For one or more of the audio signals that are from the telephone device, the technique can include translating from the second audio protocol to the first audio protocol and forwarding to the computer network telephone client (450).

The technique may further include the computer network telephone client making a call through a communications server independent of the telephone device. Likewise, the technique may further include the telephone device making a call through a communications server independent of the telephone network client.

Intercepting control messages may include, for control messages from the computer network client, intercepting control messages at a fake control device. Also, forwarding control messages from the telephone device to the computer network telephone client may include forwarding from the fake control device to the computer network telephone client. Intercepting audio signals may include, for audio signals from the computer network client, intercepting the audio signals at a fake audio device. Forwarding audio signals from the telephone device to the computer network telephone client can include forwarding from the fake audio device to the computer network telephone client.

The first control protocol and the first audio protocol can both be wired connection protocols, such as one or more universal serial bus protocols. For example, the first control protocol may be part of a universal serial bus protocol (e.g., the control messages may be formatted as HID reports according to a universal serial bus protocol), and likewise, the first audio protocol may be part of a universal serial bus protocol (e.g., the audio signals may be formatted as USB audio signals). Accordingly, the wired connection protocols may be a first set of one or more wired connection protocols (e.g., aspects of a universal serial bus protocol), and the second control protocol and the second audio protocol may both be wired connection protocols that are different from the first set of one or more wired connection protocols. For example, the second control protocol and the second audio protocol may both be protocols using Ethernet wired connections. Alternatively, the second control protocol and the second audio protocol may both be part of one or more wireless connection protocols, such as protocols that are part of or utilize a Bluetooth wireless connection protocol.

The technique may allow for extensibility to use telephone devices that use other protocols. For this explanation, the telephone device may be termed a first telephone device, and the telephone call may be termed a first telephone call. The technique may further include passing control messages between the computer network telephone client and a second telephone device for a second telephone call. The control messages passed between the computer network telephone client and the second telephone device can be formatted according to the first control protocol at the computer network telephone client and at the second telephone device. The technique may also include passing audio signals between the computer network telephone client and the second telephone device for the second telephone call. The audio signals passed between the computer network telephone client can be formatted according to the first control protocol at the computer network telephone client and at the second telephone device.

Where the telephone device is a first telephone device, the technique may further include intercepting control messages and audio signals between the computer network telephone client and a second telephone device for a second telephone call. For one or more of the control messages that are from the computer network telephone client to the second telephone device, the technique can further include translating from the first control protocol to a third control protocol and forwarding to the second telephone device. For one or more of the control messages that are from the second telephone device, the technique can include translating from the third control protocol to the first control protocol and forwarding to the computer network telephone client. For one or more of the audio signals that are from the computer network telephone client to the second telephone device, the technique can include translating from the first audio protocol to a third audio protocol and forwarding to the second telephone device. For one or more of the audio signals that are from the second telephone device, the technique can include translating from the third audio protocol to the first audio protocol and forwarding to the computer network telephone client.

Figure 5:
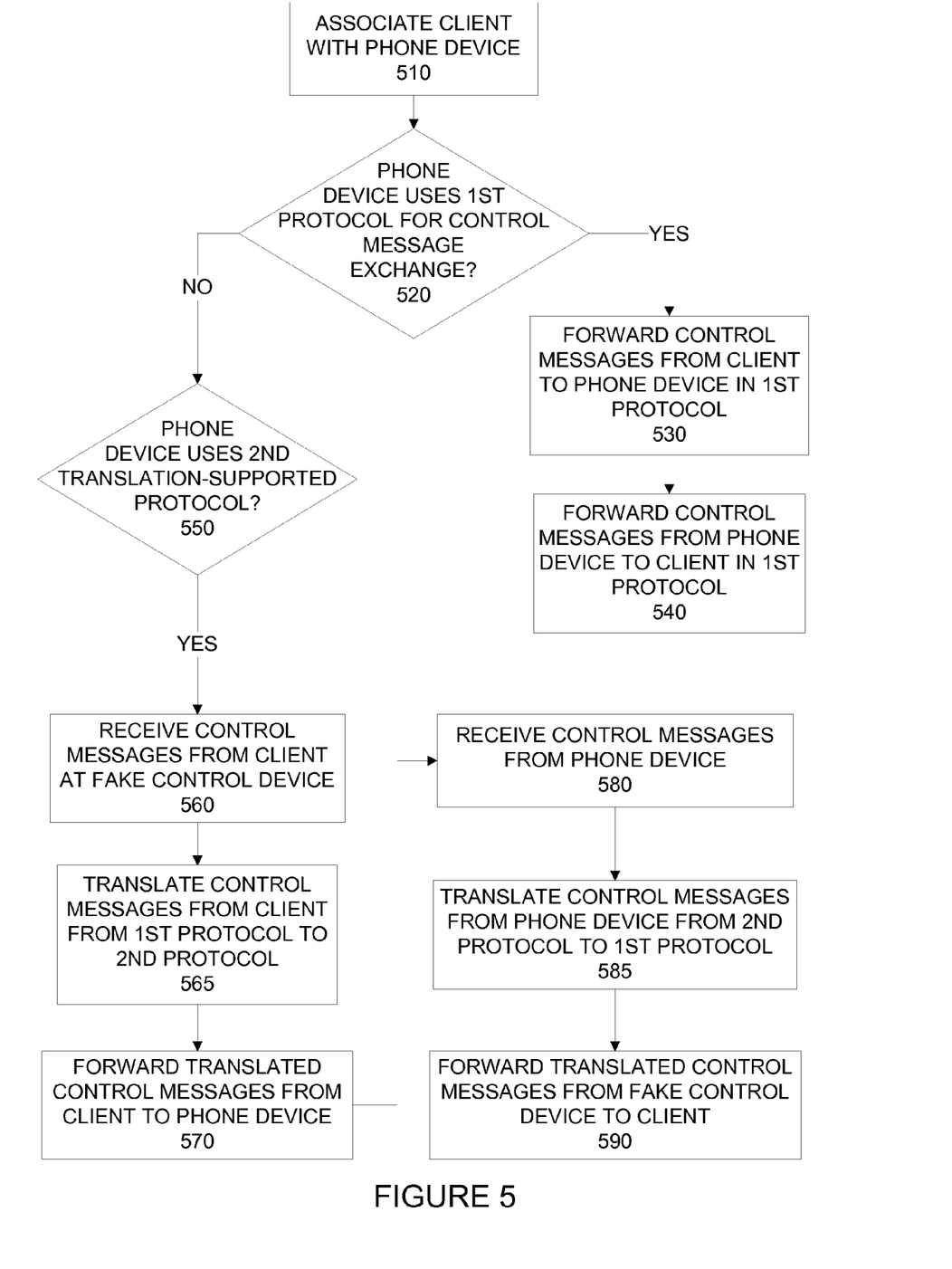
FIG. 5 is a flowchart of another technique for translation between telephone devices and network clients.

Referring now to FIG. 5, another technique for translation between telephone devices and network clients will be described. The technique can include associating (510) a computer network telephone client with a telephone device for a telephone call. The computer network telephone client can be configured to use a first protocol to exchange telephone call control messages. The technique can further include determining (520) whether the telephone device uses the first protocol to exchange telephone call control messages.

If the telephone device uses the first protocol to exchange telephone call control messages, then the technique can include forwarding (530) telephone call control messages in the first protocol from the computer network telephone client to the telephone device and forwarding (540) telephone call control messages in the first protocol from the telephone device to the computer network telephone client.

If the telephone device does not use the first protocol to exchange telephone call control messages, then it can be determined (550) whether the telephone device uses a second protocol for which translation is supported to exchange telephone call control messages. If translation with the second protocol is supported then the technique may include receiving (560) telephone call control messages from the computer network telephone client at a fake control device. The control messages from the computer network telephone client can be formatted according to the first control protocol. If translation with the second protocol is supported then the technique may further include translating (565) the control messages from the computer network telephone client from the first protocol to the second protocol and forwarding (570) the translated control messages from the computer network telephone client to the telephone device. Additionally, if translation with the second protocol is supported then the technique may further include receiving (580) telephone call control messages from the telephone device. The control messages from the telephone device can be formatted according to the second protocol. Also, if translation with the second protocol is supported then the technique may further include translating (585) the control messages from the telephone device from the second protocol to the first protocol and forwarding (590) the translated control messages from the telephone device to the telephone network client. Forwarding (590) the translated control messages from the telephone device can include forwarding from the fake control device.

The first protocol can be a first control protocol, and the second protocol can be a second control protocol. The computer network telephone client can be configured to use a first audio protocol to exchange telephone call audio signals. Similarly to the techniques above for control messages and protocols, the technique may include determining whether the telephone device uses the first audio protocol to exchange telephone call audio signals. If the telephone device uses the first audio protocol to exchange telephone call audio signals, then the technique may include forwarding telephone call audio signals from the computer network telephone client to the telephone device in the first audio protocol and forwarding telephone call audio signals from the telephone device to the computer network telephone client in the first audio protocol. If the telephone device uses a second audio protocol to exchange telephone call audio signals, then the technique can include determining whether translation with the second audio protocol is supported.

If translation with the second audio protocol is supported, then the technique may include performing acts during the telephone call. The acts can include receiving telephone call audio signals from the computer network telephone client at a fake audio device. The audio signals from the computer network telephone client can be formatted according to the first audio protocol. The acts can also include translating the audio signals from the computer network telephone client from the first audio protocol to the second audio protocol used by the telephone device to exchange telephone call audio signals. Additionally, the acts can include forwarding the translated audio signals from the computer network telephone client to the telephone device. Moreover, the acts can include receiving telephone call audio signals from the telephone device. The audio signals from the telephone device can be formatted according to the second audio protocol. The acts can also include translating the audio signals from the telephone device from the second audio protocol to the first audio protocol and forwarding the translated audio signals from the telephone device to the telephone network client. Forwarding the translated audio signals from the telephone device can include forwarding from the fake audio device.

In the technique of FIG. 5, the telephone call can be a first telephone call, and the technique can further include making a second telephone call through a communications server with the telephone network client independent of the telephone device, and making a third telephone call through the communications server with the telephone device independent of the telephone network client. Also, the control messages of the FIG. 5 technique may be human interface device reports, and the first protocol can be a wired connection protocol, such as a universal serial bus protocol. The second protocol can be a wired connection protocol that is different from the first protocol, or the second protocol may be a wireless connection protocol.

Figure 6:
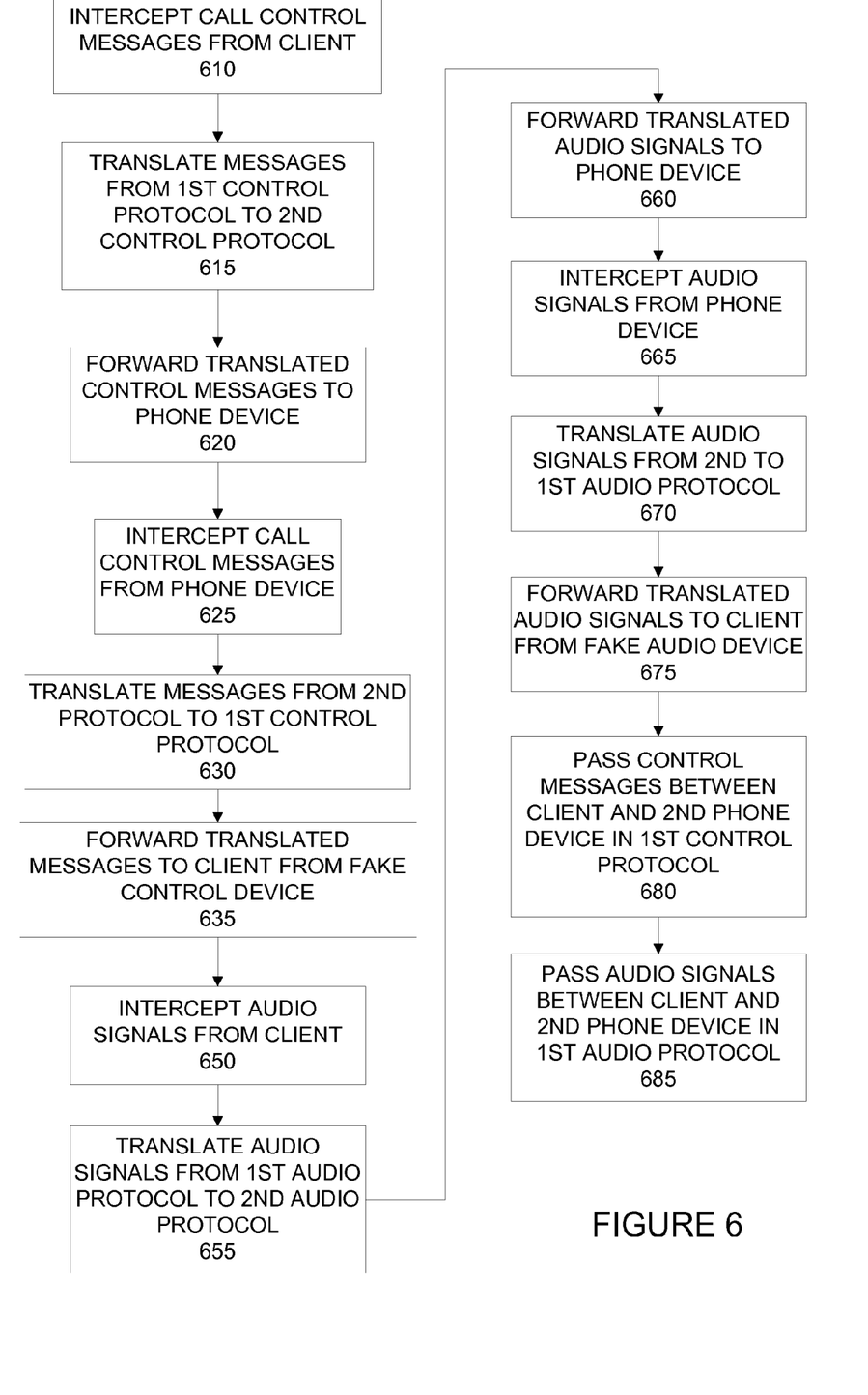
FIG. 6 is a flowchart of yet another technique for translation between telephone devices and network clients.

Referring now to FIG. 6, yet another technique for translation between telephone devices and network clients will be described. The technique can include intercepting (610) telephone call control messages from a computer network telephone client on a computing device. The control messages from the computer network telephone client can be formatted according to a first control protocol, and can be received at a fake control device on the computing device. The control messages can be translated (615) from the computer network telephone client from the first control protocol to a second control protocol. The translated control messages can be forwarded (620) from the computer network telephone client to a first telephone device. Control messages from the first telephone device can be intercepted (625), where the control messages from the first telephone device can be formatted according to the second control protocol. The control messages from the first telephone device can be translated (630) from the second control protocol to the first control protocol. The translated control messages can be forwarded (635) from the first telephone device to the telephone network client from the fake control device. Audio signals from the computer network telephone client can be intercepted (650). The audio signals from the computer network telephone client can be formatted according to a first audio protocol and can be received at a fake audio device on the computing device. The audio signals from the computer network telephone client can be translated (655) from the first audio protocol to the second audio protocol and forwarded (660) to the first telephone device. Audio signals from the first telephone device can be intercepted (665). The audio signals from the first telephone device can be formatted according to the second audio protocol. The audio signals from the first telephone device can be translated (670) from the second audio protocol to the first audio protocol, and the translated audio signals from the first telephone device can be forwarded (675) from the fake audio device to the telephone network client.

The technique of FIG. 6 can also include passing (680) control messages between the computer network telephone client and a second telephone device, which may be done without translating the messages or signals. The control messages passed between the computer network telephone client and the second telephone device can be formatted according to the first control protocol at the computer network telephone client and at the second telephone device. The technique of FIG. 6 may also include passing (685) audio signals between the computer network telephone client and the second telephone device. The audio signals passed between the computer network telephone client and the second telephone device can be formatted according to the first audio protocol at the computer network telephone client and at the second telephone device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   intercepting, via a computer system, telephone call control messages and audio signals between a first telephone device and a computer network telephone client on a computing device, the telephone call control messages and the audio signals being for a first telephone call being made through a communications server, the computer network telephone client being configured to use a first control protocol to exchange control messages and a first audio protocol to exchange audio signals;
   determining, via the computer system, that the first telephone device uses a second control protocol to exchange control messages and a second audio protocol to exchange audio signals;
   for one or more of the control messages that are from the computer network telephone client, translating, via a first translation component of the computer system, from the first control protocol to the second control protocol and forwarding to the first telephone device, the one or more of the control messages that are translated from the first control protocol to the second control protocol being communicated from the computer network telephone client to the first telephone device in a route that does not include the communications server;
   for one or more of the control messages that are from the first telephone device, translating, via the first translation component of the computer system, from the second control protocol to the first control protocol and forwarding to the computer network telephone client, the one or more of the control messages that are translated from the second control protocol to the first control protocol being communicated from the first telephone device to the computer network telephone client in a route that does not include the communications server;

for one or more of the audio signals that are from the computer network telephone client to the first telephone device, translating, via the first translation component of the computer system, from the first audio protocol to the second audio protocol and forwarding to the first telephone device, the one or more of the audio signals that are translated from the first audio protocol to the second audio protocol being communicated from the computer network telephone client to the first telephone device in a route that does not include the communications server;

for one or more of the audio signals that are from the first telephone device, translating, via the first translation component of the computer system, from the second audio protocol to the first audio protocol and forwarding to the computer network telephone client, the one or more of the audio signals that are translated from the second audio protocol to the first audio protocol being communicated from the first telephone device to the computer network telephone client in a route that does not include the communications server; and extending the computer system to add a second translation component prior to translating via the second translation component, the extending being performed utilizing existing extensibility hooks that were in the computer system prior to the extending, the extending comprising revising computer-executable instructions in the computer system to support association and synchronization of the telephone network client with telephone devices using one or more different additional protocols that had not previously been supported by the computer-executable instructions, the extending being performed without revising the telephone network client, wherein after the extending, the computer-executable instructions support association and synchronization of the telephone network client with telephone devices using the one or more different additional protocols in addition to one or more different existing protocols, which had been previously supported by the computer-executable instructions prior to the extending and are still supported by the computer-executable instructions after the extending.

2. The method of claim 1, wherein the method further comprises the computer network telephone client making a call through the communications server independent of the first telephone device.

3. The method of claim 2, wherein the method further comprises the first telephone device making a call through the communications server independent of the computer network telephone client.

4. The method of claim 1, wherein intercepting control messages comprises, for control messages from the computer network telephone client, intercepting the control messages at a fake control device, and wherein forwarding control messages from the first telephone device to the computer network telephone client comprises forwarding from the fake control device to the computer network telephone client.

5. The method of claim 1, wherein intercepting audio signals comprises, for audio signals from the computer network client, intercepting the audio signals at a fake audio device, and wherein forwarding audio signals from the first telephone device to the computer network telephone client comprises forwarding from the fake audio device to the computer network telephone client.

6. The method of claim 1, wherein the first control protocol and the first audio protocol are wired connection protocols.

7. The method of claim 6, wherein the first control protocol and the first audio protocol comprise one or more universal serial bus protocols.

8. The method of claim 6, wherein the wired connection protocols are a first set of one or more wired connection protocols, and wherein the second control protocol and the second audio protocol are wired connection protocols that are different from the first set of one or more wired connection protocols.

9. The method of claim 6, wherein the second control protocol and the second audio protocol are both part of one or more wireless connection protocols.

10. The method of claim 1, further comprising:

determining, via the computer system, that a second telephone device uses a third control protocol to exchange control messages and a third audio protocol to exchange audio signals, the third control protocol being different from the second control protocol and the third audio protocol being different from the second audio protocol;

intercepting, via the computer system, control messages and audio signals between the computer network telephone client and the second telephone device for a second telephone call;

for one or more of the control messages that are from the computer network telephone client to the second telephone device, translating, via a second translation component of the computer system, from the first control protocol to the third control protocol and forwarding to the second telephone device, the one or more of the audio signals that are translated from the first control protocol to the third control protocol being communicated from the computer network telephone client to the second telephone device;

for one or more of the control messages that are from the second telephone device, translating, via the second translation component of the computer system, from the third control protocol to the first control protocol and forwarding to the computer network telephone client, the one or more of the control messages that are translated from the third control protocol to the first control protocol being communicated from the second telephone device to the computer network telephone client;

for one or more of the audio signals that are from the computer network telephone client to the second telephone device, translating, via the second translation component of the computer system, from the first audio protocol to the third audio protocol and forwarding to the second telephone device, the one or more of the audio signals that are translated from the first audio protocol to the third audio protocol being communicated from the computer network telephone client to the second telephone device; and for one or more of the audio signals that are from the second telephone device, translating, via the second translation component of the computer system, from the third audio protocol to the first audio protocol and forwarding to the computer network telephone client, the one or more of the audio signals that are translated from the third audio protocol to the first audio protocol being communicated from the second telephone device to the computer network telephone client.

11. The method of claim 10, wherein the method further comprises:
   determining, via the computer system, that a third telephone device uses the first control protocol to exchange control messages and the first audio protocol to exchange audio signals;
   passing, via the computer system, call control messages between the computer network telephone client and a third telephone device for a third telephone call, the call control messages passed between the computer network telephone client and the third telephone device being formatted according to the first control protocol at the computer network telephone client and at the third telephone device; and
   passing, via the computer system, audio signals between the computer network telephone client and the third telephone device for the third telephone call, the audio signals passed between the computer network telephone client and the third telephone device being formatted according to the first control protocol at the computer network telephone client and at the third telephone device.

12. The method of claim 10, wherein:
   one or more of the audio signals that are translated from the first control protocol to the third control protocol are communicated from the computer network telephone client to the second telephone device in a route that does not include the communications server;
   one or more of the control messages that are translated from the third control protocol to the first control protocol are communicated from the second telephone device to the computer network telephone client in a route that does not include the communications server;
   one or more of the audio signals that are translated from the first audio protocol to the third audio protocol are communicated from the computer network telephone client to the second telephone device in a route that does not include the communications server; and
   one or more of the audio signals that are translated from the third audio protocol to the first audio protocol are communicated from the second telephone device to the computer network telephone client in a route that does not include the communications server.

13. A computer system comprising at least one processor and memory comprising computer-executable instructions stored thereon that when executed by at least one processor cause the at least one processor to perform acts comprising:
   intercepting, via a computer system, telephone call control messages between a first telephone device and a computer network telephone client on a computing device, the telephone call control messages being for a first telephone call being made through a communications server, the computer network telephone client being configured to exchange control messages according to a first control protocol;
   determining, via the computer system, that the first telephone device is configured to exchange control messages according to a second control protocol;
   for one or more of the control messages that are from the computer network telephone client, translating, via a first translation component of the computer system, from the first control protocol to the second control protocol and forwarding to the first telephone device, the one or more of the control messages that are translated from the first control protocol to the second control protocol being one or more messages communicated from the computer network telephone client to the first telephone device in a route that does not include the communications server;
   for one or more of the control messages that are from the first telephone device, translating, via the first translation component, from the second control protocol to the first control protocol and forwarding to the computer network telephone client, the one or more of the control messages that are translated from the second control protocol to the first control protocol being communicated from the first telephone device to the computer network telephone client in a route that does not include the communications server;
   intercepting, via the computer system, control messages and audio signals between the computer network telephone client and a second telephone device for a second telephone call;
   determining, via the computer system, that the second telephone device is configured to exchange control messages according to a third control protocol;
   for one or more of the control messages that are from the computer network telephone client, translating, via a second translation component of the computer system, from the first control protocol to the third control protocol and forwarding to the second telephone device, the one or more of the control messages that are translated from the first control protocol to the third control protocol being one or more messages communicated from the computer network telephone client to the second telephone device in a route that does not include the communications server;
   for one or more of the control messages that are from the second telephone device, translating, via the second translation component, from the third control protocol to the first control protocol and forwarding to the computer network telephone client, the one or more of the control messages that are translated from the third control protocol to the first control protocol being communicated from the second telephone device to the computer network telephone client in a route that does not include the communications server; and
   extending the computer-executable instructions to add the second translation component prior to translating via the second translation component, the extending being performed utilizing existing extensibility hooks that were in the computer-executable instructions prior to the extending, the extending comprising revising the computer-executable instructions to support association and synchronization of the telephone network client with telephone devices using one or more different additional protocols that had not previously been supported by the computer-executable instructions, the extending being performed without revising the telephone network client, wherein after the extending, the computer-executable instructions support association and synchronization of the telephone network client with telephone devices using the one or more different additional protocols in addition to one or more different existing protocols, which had been previously supported by the computer-executable instructions prior to the extending and are still supported by the computer-executable instructions after the extending.

14. The computer system of claim 13, wherein the computer system comprises the computer network telephone client and the first telephone device and wherein the acts further comprise:

making a third telephone call through the communications server with the computer network telephone client independent of the first telephone device; and making a fourth telephone call through the communications server with the first telephone device independent of the computer network telephone client.

15. The computer system of claim 13, wherein the control messages comprise human interface device reports.

16. The computer system of claim 13, wherein the first control protocol is a wired connection protocol.

17. The computer system of claim 13, wherein the first control protocol is a universal serial bus protocol.

18. The computer system of claim 13, wherein the first control protocol is a first wired connection protocol and the second control protocol is a second wired connection protocol that is different from the first wired connection protocol.

19. The computer system of claim 13, wherein the first control protocol is a wired connection protocol and the second control protocol is a wireless connection protocol.

20. One or more computer-readable storage media having computer-executable instructions embodied thereon that, when executed by at least one processor, cause the at least one processor to perform acts comprising:

intercepting, via a computer system, telephone call control messages between a first telephone device and a computer network telephone client on a computing device, the telephone call control messages being for a first telephone call being made through a communications server, the computer network telephone client being configured to exchange control messages according to a first control protocol;

determining, via the computer system, that the first telephone device is configured to exchange control messages according to a second control protocol;

for one or more of the control messages that are from the computer network telephone client, translating, via a first translation component of the computer system, from the first control protocol to the second control protocol and forwarding to the first telephone device, the one or more of the control messages that are translated from the first control protocol to the second control protocol being one or more messages communicated from the computer network telephone client to the first telephone device in a route that does not include the communications server;

for one or more of the control messages that are from the first telephone device, translating, via the first translation component, from the second control protocol to the first control protocol and forwarding to the computer network telephone client, the one or more of the control messages that are translated from the second control protocol to the first control protocol being one or more messages communicated from the first telephone device to the computer network telephone client in a route that does not include the communications server;

intercepting, via the computer system, control messages and audio signals between the computer network telephone client and a second telephone device for a second telephone call;

determining, via the computer system, that the second telephone device is configured to exchange control messages according to a third control protocol, the third control protocol being different from the second control protocol;

for one or more of the control messages that are from the computer network telephone client to the second telephone device, translating, via a second translation component of the computer system, from the first control protocol to the third control protocol and forwarding to the second telephone device, the one or more control messages that are translated from the first control protocol to the third control protocol being one or more messages communicated from the computer network telephone client to the second telephone device in a route that does not include the communications server;

for one or more of the control messages that are from the second telephone device, translating, via the second translation component, from the third control protocol to the first control protocol and forwarding to the computer network telephone client, the one or more control messages that are translated from the third control protocol to the first control protocol being one or more messages communicated from the second telephone device to the computer network telephone client in a route that does not include the communications server; and extending the computer-executable instructions to add the second translation component prior to translating via the second translation component, the extending being performed utilizing existing extensibility hooks that were in the computer-executable instructions prior to the extending, the extending comprising revising the computer-executable instructions to support association and synchronization of the telephone network client with telephone devices using one or more different additional protocols that had not previously been supported by the computer-executable instructions, the extending being performed without revising the telephone network client, wherein after the extending, the computer-executable instructions support association and synchronization of the telephone network client with telephone devices using the one or more different additional protocols in addition to one or more different existing protocols, which had been previously supported by the computer-executable instructions prior to the extending and are still supported by the computer-executable instructions after the extending.

* * * * *